(12) United States Patent
Kimura et al.

(10) Patent No.: US 10,240,650 B2
(45) Date of Patent: Mar. 26, 2019

(54) PARKING BRAKE DEVICE IN CALIPER BRAKE DEVICE FOR RAILWAY VEHICLE

(71) Applicant: NIPPON STEEL & SUMITOMO METAL CORPORATION, Tokyo (JP)

(72) Inventors: Ryouichi Kimura, Tokyo (JP); Kazuaki Fujita, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/898,494

(22) PCT Filed: Jun. 19, 2014

(86) PCT No.: PCT/JP2014/066298
§ 371 (c)(1),
(2) Date: Dec. 15, 2015

(87) PCT Pub. No.: WO2014/203970
PCT Pub. Date: Dec. 24, 2014

(65) Prior Publication Data
US 2016/0131214 A1    May 12, 2016

(30) Foreign Application Priority Data
Jun. 19, 2013    (JP) ................................. 2013-128696

(51) Int. Cl.
*F16D 65/18*    (2006.01)
*B61H 5/00*    (2006.01)
(Continued)

(52) U.S. Cl.
CPC ............ *F16D 65/18* (2013.01); *B60T 17/228* (2013.01); *B61H 5/00* (2013.01); *F16D 55/2245* (2013.01);
(Continued)

(58) Field of Classification Search
CPC .. F16D 65/18; F16D 55/2255; F16D 2121/04; B61H 5/00
See application file for complete search history.

(56) References Cited

U.S. PATENT DOCUMENTS 3,954,304 A * 5/1976 Engle .................... B60T 8/1893
188/170
4,364,305 A * 12/1982 Dalibout ............... B60T 17/083
188/170
(Continued)

FOREIGN PATENT DOCUMENTS

| JP | 63-125834 | 5/1988 |
| JP | 2001-206213 | 7/2001 |
| JP | 2008-261439 | 10/2008 |

*Primary Examiner* — Vishal R Sahni
(74) *Attorney, Agent, or Firm* — Clark & Brody

(57) ABSTRACT

A parking brake reduced in size and simplified is installed on a rod-protruding side of a cylinder of a caliper braking device. A second piston is provided within the second cylinder that is coaxially coupled with the cylinder and movable coaxially relative to the rod. A one-way clutch is provided to switch ON/OFF due to a releasing/pressing by the second piston with respect to a switch disposed facing a cylinder side surface of the second piston. A parking operation auxiliary spring is provided on the side of the cylinder within a second cylinder, and a manual release piston is provided in a space of the second cylinder. A parking release lever pushes a manual release rod at the tip end of the manual release piston, pushing the second piston in the direction of retraction of the rod, at the same time as the manual release rod pushes into the rod.

5 Claims, 4 Drawing Sheets

(51) Int. Cl.
    *B60T 17/22*       (2006.01)
    *F16D 55/2255*    (2006.01)
    *F16D 55/224*     (2006.01)
    *F16D 121/04*     (2012.01)
    *F16D 127/06*     (2012.01)
    *F16D 129/02*     (2012.01)
    *F16D 121/16*     (2012.01)
    *F16D 125/58*     (2012.01)

(52) U.S. Cl.
    CPC ...... *F16D 55/2255* (2013.01); *F16D 2121/04* (2013.01); *F16D 2121/16* (2013.01); *F16D 2125/582* (2013.01); *F16D 2127/06* (2013.01); *F16D 2129/02* (2013.01)

(56) References Cited

U.S. PATENT DOCUMENTS

| | | | | |
|---|---|---|---|---|
| 4,478,319 A | * | 10/1984 | Casalone | B60T 17/086 188/170 |
| 6,435,321 B1 | * | 8/2002 | Asano | F16D 65/14 188/170 |
| 7,163,090 B2 | * | 1/2007 | Huber, Jr. | B60T 17/08 188/170 |
| 2014/0231192 A1 | * | 8/2014 | Asano | B61H 1/00 188/74 |

* cited by examiner

PARKING BRAKE DEVICE IN CALIPER BRAKE DEVICE FOR RAILWAY VEHICLE

TECHNICAL FIELD

The present invention relates to a parking brake device installed in a caliper brake device which imparts a braking force on both side surfaces of a wheel of a railway vehicle by clamping a brake disc (referred to below simply as a disc) that rotates together with the wheel.

BACKGROUND ART

A caliper brake device for a railway vehicle is installed as a braking device to clamp both sides of a disc that rotates together with the wheel. The caliper brake device (referred to below as a service brake) decelerates and stops the railway vehicle while it is traveling, and also prevents the railway vehicle from moving while stopping (referred to below as a parking brake).

The parking brake device described in Patent Reference 1 actuates a parking brake by using only a spring force of a spring disposed within a brake cylinder which forms the service brake.

However, if a parking brake device is actuated only by the spring force, an axial length of the brake cylinder has to increase because the length of the spring increases. In addition, a mechanism for manually releasing the spring force becomes complicated, because it becomes necessary to use a spring having a large spring force. Moreover, it becomes difficult to install the parking brake device in the existing brake cylinder, because the increased axial length of the brake cylinder also makes the manual release mechanism more complicated, and this also makes the device poorly suited for ordinary use.

PRIOR ART REFERENCES

Patent References

Patent Reference 1: Japanese Patent Application Kokai Publication No. 2008-261439

SUMMARY OF THE INVENTION

Problems to be Solved by the Invention

One problem which the present invention aims to solve is that the axial length of the brake cylinder increases and the mechanism for manual release of the spring force becomes complicated in the case of a parking brake device that actuates a parking brake by using only the spring force. Another problem is that it becomes difficult to install the parking brake device in an existing brake cylinder, making the device poorly suited for ordinary use.

Means for Solving these Problems

The present invention was designed with the object of having an axial length of a brake cylinder which does not increase, so that a manual release mechanism does not increase in complexity, and with the further object of making it possible to easily install it in an existing brake cylinder.

In order to achieve the above objects, the present invention provides a parking brake device disposed on a rod protruding side of a brake cylinder for the service brake, and comprised a structure for holding the rod protruded from the cylinder and for preventing the rod from retracting.

According to the present invention, the structure for holding the rod protruded from the cylinder has:

a second cylinder that is coaxially coupled to the cylinder of the brake cylinder;

a second piston that protrudes outwardly from a side wall of the second cylinder having a front end surface on the rod protruding side, the piston provided within the second cylinder coaxially with the rod and movable relative to the rod;

a switch disposed in a position facing a side surface of the cylinder of the second piston, the switch being turned ON when it is released from a pressure from the second piston, and being turned OFF when it is pressed by the second piston;

a one-way clutch that prevents the rod from retracting into the cylinder when the switch is in an ON state;

a parking operation auxiliary spring that is disposed in a space on the cylinder side within the second cylinder which is partitioned by the second piston, and that pushes the second piston in a rod-protrusion direction, so as to release the pressure of the second piston on the switch during normal operation; and a release mechanism that presses the switch so that the second piston is pushed from outside of the second cylinder toward the rod-retraction direction.

According to the present invention, the axial length of the brake cylinder does not increase as much as in the case where the parking brake is actuated only by a spring force, because the holding and release of the rod from a protruding state is switched by switching the one-way clutch ON and OFF. In addition, the release mechanism is simplified.

Moreover, according to the present invention, the release mechanism is simplified, making it possible to easily install the parking brake device in an existing brake cylinder, because the axial length of the brake cylinder does not increase, and because the second piston is pushed from outside of the second cylinder toward the rod-retraction direction.

Advantageous Effects of the Invention

According to the present invention, it is possible to release a spring force with a simple mechanism, without increasing an axial length of the brake cylinder, because holding and release of a rod from a protruding state is switched by switching a one-way clutch ON and OFF. It is therefore possible to reduce the size of the parking brake device and to make it simpler, so that it can be easily installed in an existing brake cylinder.

BRIEF DESCRIPTION OF THE DRAWINGS

FIG. 1 (b) is an enlarged view of part A of FIG. 1. (a).

FIG. 2 (a) is a side view and FIG. 2 (b) is a sectional view taken along the line B-B in FIG. 2 (a).

EMBODIMENT

The present invention is designed to reduce the size and simplify a parking brake device, and aims to make it possible to easily install a parking brake device in an existing braking cylinder. This is achieved by switching holding and release of the rod from a protruding state by switching a one-way clutch ON and OFF.

Example

The present invention is a parking brake device which holds a rod in a protruding state when installed on a protruding side of a rod of a brake cylinder which is a structural element of a caliper brake device for a railway vehicle which brakes by clamping with a brake lining on both sides of a disc that rotates together with the wheel.

Figure 1A:
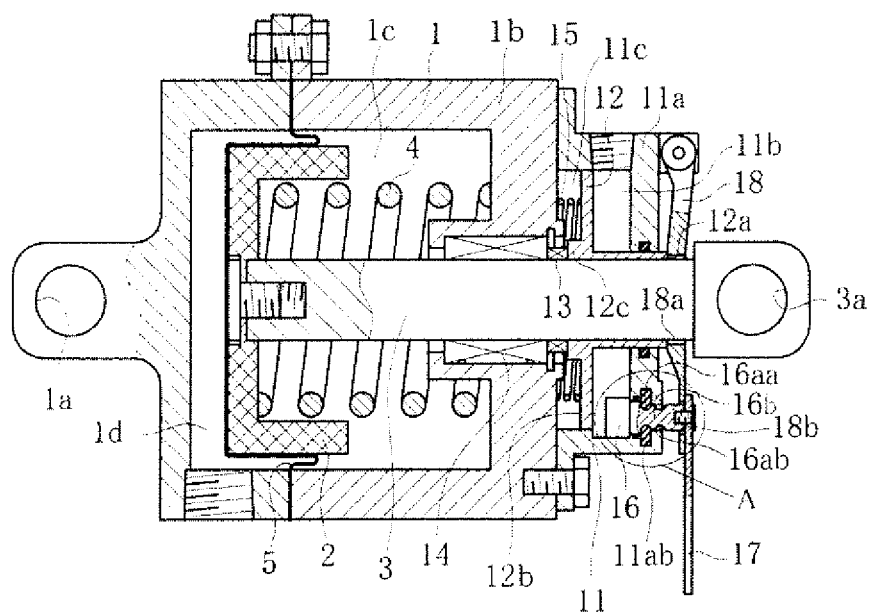
FIG. 1 (a) is a schematic diagram illustrating an example of the parking brake device according to the present invention which is installed in a caliper brake device for a railway vehicle.
Figure 1B:
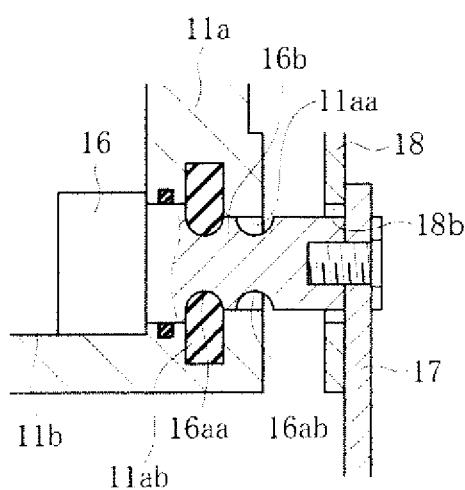

An example of a pneumatic brake cylinder that is a structural element of a caliper brake device that actuates the service brake is described making reference to FIG. 1.

Reference Numeral 1 is a cylinder with two axially divided parts that are connected. Reference Numeral 2 is a piston provided so as to freely move within the cylinder 1 in the axial direction of the cylinder 1, and in a central portion of one of the side surfaces of the piston 2 there is integrally attached a rod 3 the tip end part of which protrudes from the cylinder 1. During normal operation, the rod 3 retracts inside the cylinder 1, because of a coil spring 4 disposed in an internal space 1c of the cylinder 1 on a side to which is attached the rod 3 of the piston 2.

Reference Numeral 5 is a diaphragm inserted between the connecting surfaces of the cylinder 1 to prevent compressed air, supplied to a space 1d on a side opposite from the side where the rod 3 is attached in the cylinder 1, from leaking into a space 1c on the side where the rod 3 is attached. The diaphragm 5 is disposed on a side opposite from the side on which is attached the rod 3 of the piston 2.

Using a pneumatic brake cylinder with the above construction, the rod 3 protrudes from the cylinder 1 when compressed air is supplied to the space 1d on the side opposite from the side where the rod 3 is attached within the cylinder 1. Protrusion of the rod 3 causes the distance to increase between a connecting hole 1a provided on an end surface on the side opposite from the protruding side of the rod 3 of the cylinder 1 and a connecting hole 3a provided at a tip end part of the rod 3.

Accordingly, when a tip end part of a pair of brake levers having a freely rotating base end part attached is caused to approach the two connecting holes 1a and 3a, the disc is clamped by a brake lining attached to the tip end part of each respective brake lever, and braking occurs.

The parking brake device of the present invention is disposed on a protruding side of the rod 3 of the cylinder 1 in a pneumatic brake cylinder having the above structure, for example, and functions to hold the protruding rod 3, thereby preventing the rod 3 from retracting, and has the structure described below, for example.

Reference Numeral 11 is a second cylinder coaxially coupled to the cylinder 1 of the pneumatic brake cylinder, and the rod 3 passes through the second cylinder 11 so that its tip end part protrudes to the outside.

Reference Numeral 12 is a second piston disposed within the second cylinder 11 coaxially with the rod 3 and provided to move freely with respect to the rod 3. The second piston 2 is designed so that a tip end surface 12a on the protruding side of the rod 3 protrudes outward beyond a side wall 11a of the second cylinder 11.

Reference Numeral 13 is a switch installed on an inner peripheral side portion of a side wall 1b of the cylinder 1 of the service brake device, disposed facing a side surface 12b of the second piston 2, and facing an end surface of a protruding portion 12c on a side of the side surface 12b. The switch 13 is OFF when the second piston 12 is pressed by compressed air supplied to a space 11b on a side opposite to the cylinder 1 of the second cylinder 11 which is partitioned by the second piston 12. On the other hand, the switch 13 is turned ON when the compressed air is vented, and the second piston 12 moves away from the switch 13 because of the spring force of a parking operation auxiliary spring 15 which is described below, thereby releasing the pressing.

Reference Numeral 14 is a one-way clutch provided on an inner peripheral side portion of the side wall 1b of the cylinder 1, and is switched ON and OFF by switching the switch 13 ON and OFF. When the one-way clutch 14 is OFF, it does not constrain the protruding/retracting movement of the rod 3, so the rod 3 is able to freely protrude and retract. However, when the one-way clutch 14 is ON, is allows the rod 3 to protrude, but prevents the rod 3 from retracting.

The one-way clutch 14 is formed in a tapered shape, with the larger-sized portion in the direction of protrusion of the rod 3, and forming a through-portion for the rod 3 in the side wall 1b, and utilizes a construction in which a group of balls is disposed on the periphery of the rod 3 positioned in the through-portion, for example (e.g., see WO/2011/081209). In such a construction, when the one-way clutch 14 is ON, the group of balls is positioned at the smaller-sized portion of the taper, pressing on the rod 3 to prevent retraction of the rod 3. On the other hand, when the one-way clutch 14 is OFF, the group of balls is positioned at the larger-sized portion of the taper, so they do not press on the rod 3, making it possible for the rod 3 to freely protrude and retract.

However, there are no particular limitations on the construction of the one-way clutch 14, as long as the rod 3 can freely protrude and retract when the one-way clutch 14 is OFF, and as long as the rod 3 is prevented from retracting from a state of protrusion from the cylinder 1 and the second cylinder 11 when the parking brake is actuated when the one-way clutch 14 is ON.

Reference Numeral 15 is a parking operation auxiliary spring disposed on the outer periphery side of the protruding portion 12c of the second piston 12 in a space 11c on the side of the cylinder 1 within the second cylinder 11 which is partitioned by the second piston 12. During normal operation, the parking operation auxiliary spring 15 operates by using a spring force which presses the second piston 12 in the direction of protrusion of the rod 3.

Reference Numeral 16 is a manual release piston which is a structural element of a release mechanism that pushes the second piston 12 from outside of the second cylinder 11 toward the direction of retraction of the rod 3. The manual release piston 16 is provided in the space 11b of the second cylinder 11. The tip end of the manual release piston 16 passes through the side wall 11a of the second cylinder 11 and protrudes outwards, and in addition, in two places in the axial direction, for example, on the outer periphery of the shank portion thereof, there are formed positioning indentations 16aa and 16ab. Spacing of these indentations 16aa and 16ab in the axial direction is at an interval extending from a state in which the second piston 12 presses against the switch 13, to a state in which compressed air is vented from the space 11b and the second piston 12 moves away from the switch 13, until the pressing on the switch 13 is released.

On the other hand, an elastic projection 11ab for positioning, that engages with the indentation 16aa on the side of the cylinder 1 when the manual release piston 16 is pressed against the side wall 11a, is provided in a through-hole 11 as which is disposed on the side wall 11a of the second cylinder 11 through which passes a shank portion 16b of the manual release piston 16 on which are forming the indentations 16aa and 16ab.

Reference Numeral 17 is a manual release rod affixed at the tip end of the manual release piston 16 that protrudes to the outside of the side wall 11a of the second cylinder 11. The manual release rod 17 pushes into the direction in which the rod 3 retracts into the cylinder 1 when the parking brake is released, pushing the manual release piston 16 into the inner portion of the second cylinder 11.

Reference Numeral 18 is a parking release lever provided with a hole 18a that touches the tip end surface 12a of the second piston 12 while allowing the rod 3 to pass through the center portion, and is also provided with a hole 18b at the tip end for the manual release piston 16 to pass through the shank portion 16b. The base end side thereof is supported so as to freely swing on a side facing the manual release piston 16 of the second cylinder 11, and this enables it to push the second piston 12 in the direction of retraction of the rod 3 against the spring force of the parking operation auxiliary spring 15, at the same time as it pushes the manual release rod 17 in the retraction direction of the rod 3.

The operation of the above-described parking brake device of the present invention is explained as follows.

(When Braking is not Actuated)

Compressed air is introduced only into a space 11b on the side opposite to the cylinder 1 of the second cylinder 11. Accordingly, pressure operates on the second piston 12, the second piston 12 compresses the parking operation auxiliary spring 15, moving in the retraction direction of the rod 3, and pressing the switch 13 so that the switch 13 is in an OFF state. In this state, the rod 3 is able to move in either the protruding or the retracting direction. The manual release piston 16 is pushed against the side wall 11a of the second cylinder 11 by this pressure.

(When the Service Brake is Actuated)

Starting from the state when braking is not actuated, compressed air is introduced into the space 1d on the side opposite from the side where the rod 3 of the piston 2 is attached. Accordingly, the piston 2 compresses the coil spring 4, and the rod 3 moves in the direction of protrusion of the rod 3. Due to the movement of the rod 3, there is a widening of the base end side of the brake lever which is connected to the connecting hole 1a of the cylinder 1 and the connecting hole 3a of the rod 3, which closes the tip end, and the brake lining disposed at the tip end part clamps the disc, so braking occurs.

(Release of the Service Brake)

After braking, only the compressed air that was introduced into the space 1d on the side opposite from the side where the rod 3 of the piston 2 is attached is released, and the pressure that was applied to the piston 2 is released. Accordingly, the rod 3 retracts because of the recovery force of the coil spring 4, and the base end side of the brake lever is clamped, but when the brake lining provided at the tip end part is caused to move away, so the braking is released.

(When the Parking Brake is Actuated)

When the service brake is in a state of being actuated, the compressed air that was introduced into the space 11b on the side opposite from the cylinder 1 of the second cylinder 11 is vented, and the pressure that was applied to the second piston 12 is released. Accordingly, when the second piston 12 is pressed in the direction of protrusion of the rod 3, due to the recovery force of the parking operation auxiliary spring 15, a surface of the protruding portion 12c of the second piston 12 moves away from the switch 13, so as to switch the one-way clutch 14 to the ON state.

When the one-way clutch 14 is switched ON, the rod 3 is able to move in the protruding direction, but it is no longer able to move in the retracting direction, so that even if there is a reduction in pressure in the space 1d on the side opposite from the side where the rod 3 of the piston 2 is attached, the clamping state of the brake lining on the disc is kept.

When the clamping force of the brake lining on the disc decreased owing to a drop of the temperature of the disc and the brake lining from high temperature after braking, the residual air pressure in the space 1d on the side opposite from the side where the rod 3 of the piston 2 is attached causes the rod 3 to move in the direction of protrusion, therefore the parking brake force can be kept.

(When the Parking Brake is Manually Released)

When the parking brake is in an operating state, the manual release rod 17 is pushed in the direction of retraction of the rod 3, to move the manual release piston 16 in the direction of retraction of the rod 3. This movement is continued until the engagement of the elastic projection 11ab disposed at the side wall 11a of the second cylinder 11 with the indentation provided in the shank portion 16b shifts from engagement with the indentation 16aa on the side of the cylinder 1 to engagement with the indentation 16ab on the other side of the cylinder 1.

At the same time as the manual release piston 16 moves, the parking release lever 18 swings in the direction of retraction of the rod 3. Accompanying this swinging motion, the second piston 12 is pushed in the direction of retraction of the rod 3 and pushes the switch 13, switching the one-way clutch 14 to OFF. When the one-way clutch 14 is switched to OFF, the rod 3 becomes able move in either the protruding direction or the retracting direction, and the parking brake is released.

(Release of the Manual Release State of the Parking Brake)

While in a state of manual release, pneumatic pressure is supplied into the space 11b on the side opposite from the cylinder 1 of the second cylinder 11. Accordingly, pressure is applied to the second piston 12 and the manual release piston 16, the second piston 12 is pushed in the direction of retraction of the rod 3, and the switch 13 is switched to OFF. On the other hand, the manual release piston 16 is pressed against the side wall 11a of the second cylinder 11, and the engagement of the elastic projection 11ab disposed at the side wall 11a with the indentation provided to the shank portion 16b shifts from engagement with the indentation 16ab on the opposite side of the cylinder 1 to engagement with the indentation 16aa on the side of the cylinder 1, thus returning to the original position.

The above-described parking brake device of the present invention can be reduced in size and simplified, because switching the one-way clutch 14 ON and OFF switches the retention and release of the rod 3 from the protruding state. Moreover, it becomes easy to install the parking brake device in an existing brake cylinder.

The present invention is not limited to the above-described example, and the preferred embodiment may, of course, be advantageously modified within the scope of the technical ideas recited in the claims.

For example, in the above example, the one-way clutch 14 is provided at the side wall 1b of the cylinder 1, and switching ON and OFF of the one-way clutch 14 is carried out by the switch 13. However, as shown in FIG. 4, the one-way clutch 14 can be provided inside the second cylinder 11, and switching ON and OFF of the one-way clutch 14 can be carried out directly by moving the second piston 12, so the switch 13 may be eliminated.

Figure 4:
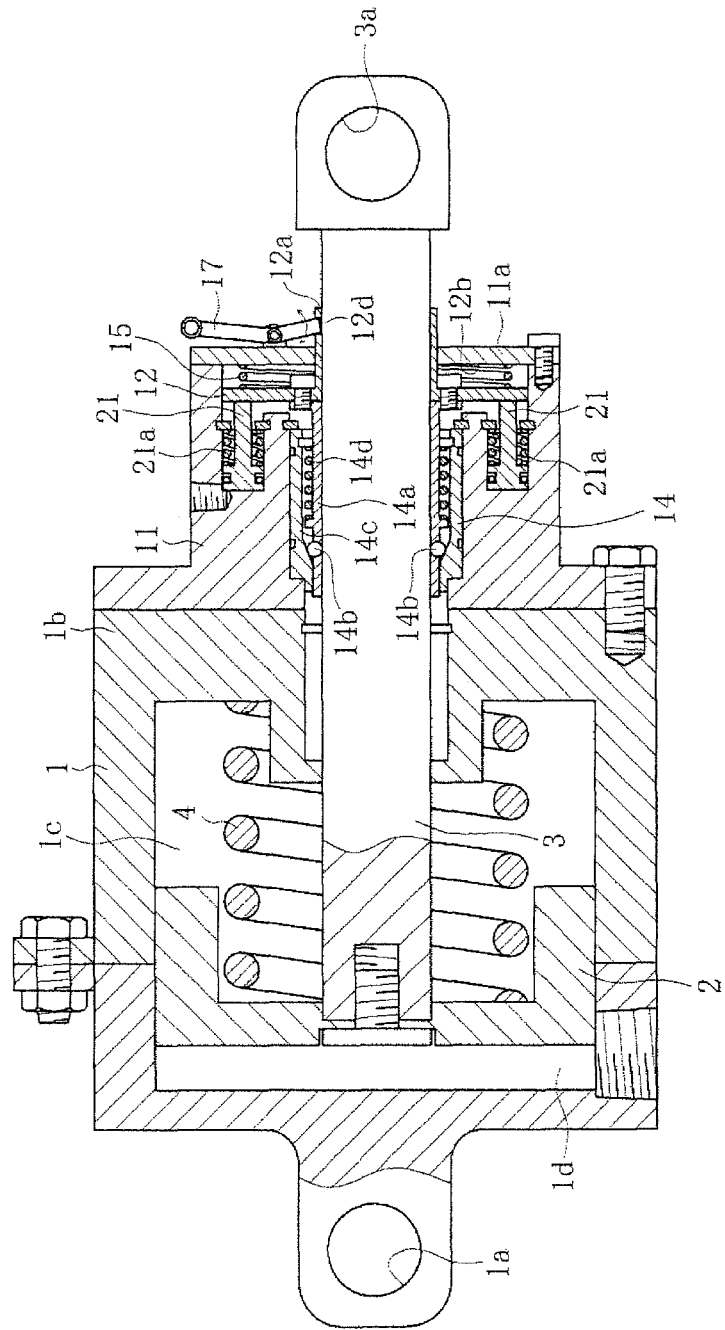
FIG. 4 is a schematic diagram illustrating another example of the parking brake device according to the present invention which is installed in a caliper brake device for a railway vehicle.

In the example shown in FIG. 4, an inner casing 14a of the one-way clutch 14 provided within the second cylinder 11 is coupled integrally with the second piston 12. By moving in the direction of protrusion of the rod 3 of the second piston 12, a group of balls 14b held in the inner casing 14a so as to freely rotate, releases the pressure on the inner tapered surface of the outer casing 14c, thereby allowing the rod 3 to protrude and to retract. Conversely, by moving in the direction of retraction of the rod 3 of the second piston 12, the group of balls 14b is pressed against the inner tapered surface of the outer casing 14c, thereby preventing the rod 3 from retracting.

Reference Numeral 21 is a plurality of parking release pistons provided inside the second cylinder 11. During normal operation, when the rod 3 is allowed to freely protrude and retract, compressed air is supplied to the parking release pistons 21, and the rod 3 of the second piston 12 is caused to move by being pressed in the direction of protrusion of the rod 3, against the spring force of the parking operation auxiliary spring 15 provided between the second piston 12 and the side wall 11a.

The inner casing 14a moves in the direction of protrusion of the rod 3, together with the movement of the seconds piston 12, and the pressing of the group of balls 14b toward the inner tapered surface of the outer casing 14c is released. When this happens, an internal spring 14d disposed between the inner casing 14a and the outer casing 14c is compressed.

On the other hand, when the parking brake is actuated and the rod 3 is prevented from retracting, the supply of compressed air to the parking release pistons 21 is stopped. When the supply of compressed air stops, the second piston 12 is pushed in the direction of retraction of the rod 3, and moves as a result of the spring force of a return spring 21a inside the parking release piston 21 and the parking operation auxiliary spring 15.

Together with the movement of the second piston 12, the inner casing 14a moves in the direction of retraction of the rod 3, and the internal spring 14d, disposed between the inner casing 14a and the outer casing 14c, returns to its original spring length and presses on the group of balls 14b at the inner tapered surface of the outer casing 14c.

If the parking brake is released manually, one end side of the manual release rod 17, the center of which is supported so as to freely rotate, is caused to rotate in a counterclockwise direction at the side wall 11a of the second cylinder 11 when the parking brake is actuated. This rotation pulls the second piston 12, at another end part which is inserted into a hole 12d at the tip end part of the second piston 12, in the direction of protrusion of the rod 3, against the spring force of the internal spring 14d, thereby releasing the pressing of the group of balls 14b toward the inner tapered surface of the outer casing 14c.

Figure 2:
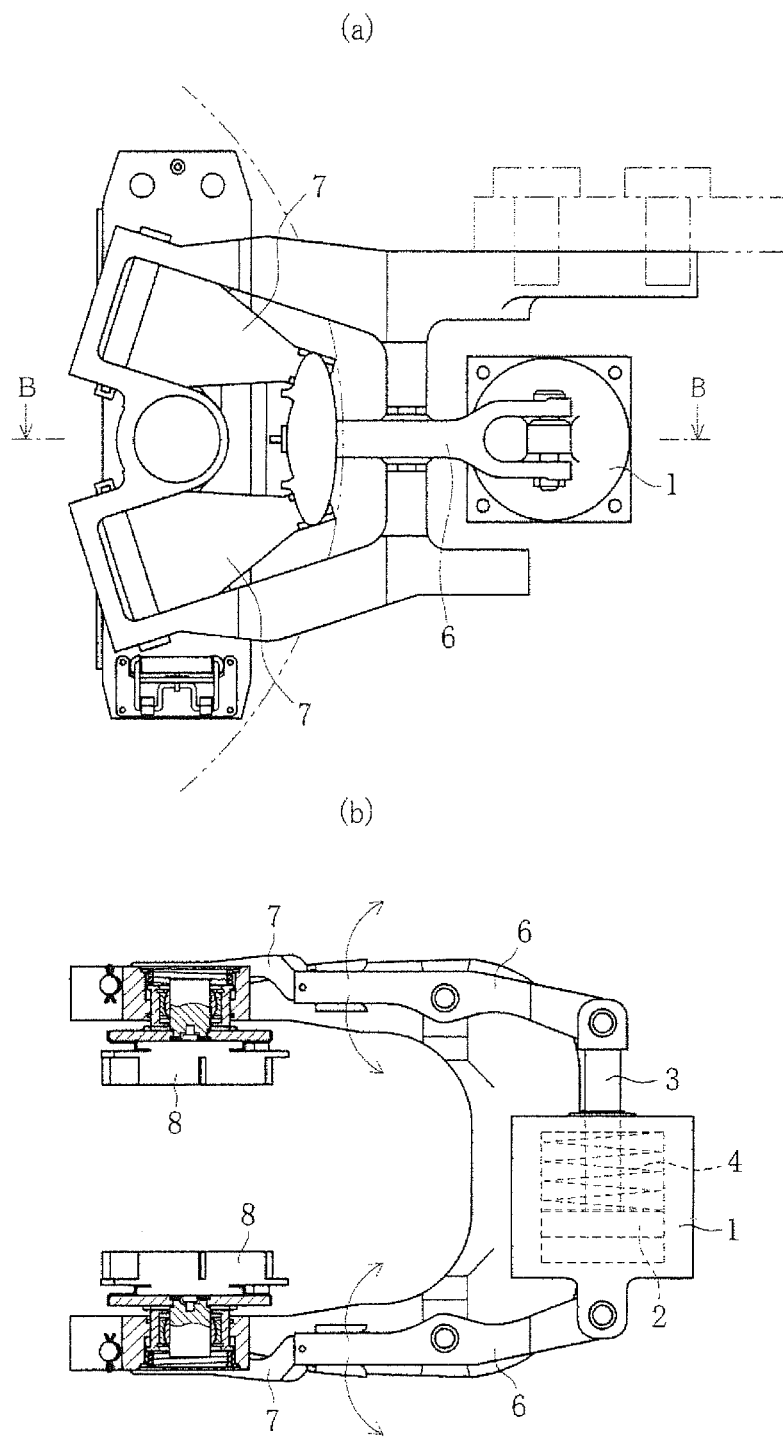
FIG. 2 is a drawing illustrating an example of the parking brake device according to the present invention which is installed in a caliper brake device for a railway vehicle.
Figure 3:
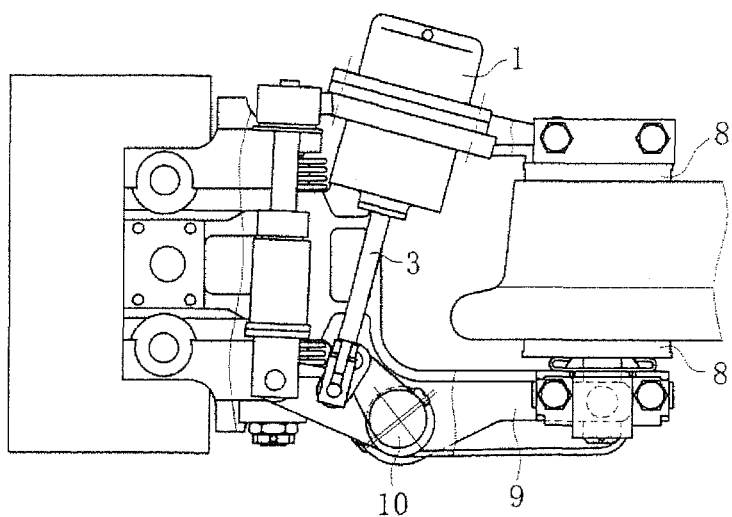
FIG. 3 is a partial sectional view taken from above a wheel, illustrating another example of the parking brake device according to the present invention which is installed in a caliper brake device for a railway vehicle.

A caliper brake device having the parking brake device of the present invention is not limited to using the brake lever described in Patent Reference 1. Even greater size reduction may be achieved by using a two-stage brake lever, as shown in FIG. 2, or by rotating the brake lever by using an eccentric shaft, as shown in FIG. 3. In FIG. 2, Reference Numeral 6 is a first brake lever, Reference Numeral 7 is a second brake lever, Reference Numeral 8 is a brake lining. In FIG. 3, Reference Numeral 9 is a brake lever, and Reference Numeral 10 is an eccentric shaft.

EXPLANATION OF THE REFERENCE NUMERALS

1 Cylinder
3 Rod
11 Second cylinder
11a Side wall
11ab Elastic projection
11b Space on the side opposite from the cylinder
11c Space on the cylinder side
12 Second piston
12a Tip end surface on the protruding side of the rod
13 Switch
14 One-way clutch
15 Parking operation auxiliary spring
16 Manual release piston
16aa, 16ab Indentations
16b Shank portion
17 Manual release rod
18 Parking release lever

The invention claimed is:

1. A parking brake device in a caliper brake device for a railway vehicle disposed on a rod protruding side of a rod of a piston provided to move freely within a brake cylinder, for decelerating or stopping a railway vehicle while traveling,
the parking brake device comprising a structure for holding the rod protruded from the bake cylinder and for preventing the rod from retracting, the structure being achieved by switching a one-way clutch from OFF to ON by turning a switch, which is installed on an inner peripheral side portion of a side wall of the brake cylinder, from OFF to ON by a spring force of a parking operation auxiliary spring disposed in a second cylinder coupled in series and coaxially with the brake cylinder, the OFF position of the one-way clutch not constraining a protruding/retracting movement of the rod and the ON position of the one-way clutch allowing protruding movement of the rod but preventing retracting movement.

2. The parking brake device according to claim 1, wherein the structure for holding the rod protruded from the brake cylinder and for preventing the rod from retracting comprises:
the second cylinder;
a second piston that protrudes outwardly from a side wall of the second cylinder having a front end surface on the rod protruding side, the second piston provided within the second cylinder coaxially with the rod and movable relative to the rod;
the switch disposed in a position facing a side surface of the second piston which faces a side wall of the brake cylinder,
the switch being turned ON when it is released from a pressure from the second piston, and being turned OFF when it is pressed by the second piston;
the one-way clutch preventing the rod from retracting into the brake cylinder when the switch is turned ON;
the parking operation auxiliary spring disposed in a space on the brake cylinder side within the second cylinder which is partitioned by the second piston, and that pushes the second piston in a rod-protrusion direction, so as to release the pressure of the second piston on the switch during normal operation; and a release mechanism that presses the switch so that the second piston is pushed from outside of the second cylinder toward the rod-retraction direction.

3. The parking brake device according to claim 2, wherein the release mechanism that presses the switch so that the second piston is pushed from outside of the second cylinder toward the rod-retraction direction comprises:

a manual release piston disposed in a space within the second cylinder on a side opposite from the brake cylinder and having a tip end protruding to the outside of the second cylinder, and which is positionable in a specified position;

a manual release rod affixed at the tip end of the manual release piston that protrudes to the outside of the second cylinder and pushes the manual release piston in the rod-retraction direction;

a parking release lever that pushes the second piston in the rod-retraction direction, against a spring force of the parking operation auxiliary spring, at the same time as the manual release rod pushes in the rod-retraction direction.

4. The parking brake device according to claim 3, wherein the manual release piston is positioned by having a plurality of positioning indentations formed in an axial direction on an outer periphery of a shank portion of the manual release piston, and having a positioning elastic projection that engages with one of the indentations in an axial direction on the side wall of the second cylinder through which passes the shank portion on which the indentations are formed.

5. The parking brake device according to claim 1, wherein the one-way clutch is provided on the inner peripheral side portion of the side wall of the brake cylinder.

* * * * *